United States Patent [19]
Chan et al.

[11] Patent Number: 5,917,686
[45] Date of Patent: Jun. 29, 1999

[54] HIGH CURRENT GROUND FAULT CIRCUIT INTERRUPTER

[75] Inventors: David Y. Chan, Bellerose; Saul Rosenbaum, East Meadow, both of N.Y.

[73] Assignee: Leviton Manufacturing Co., Inc., Little Neck, N.Y.

[21] Appl. No.: 08/918,454

[22] Filed: Aug. 26, 1997

Related U.S. Application Data

[63] Continuation of application No. 08/808,713, Feb. 28, 1997, abandoned, which is a continuation of application No. 08/458,313, Jun. 2, 1995, abandoned, which is a continuation of application No. 08/304,101, Sep. 9, 1994, abandoned, which is a continuation of application No. 07/977,308, Nov. 16, 1992, abandoned.

[51] Int. Cl.$^6$ ........................................................ H02H 3/00
[52] U.S. Cl. ................................................. 361/42; 361/44
[58] Field of Search ........................................ 361/42–50

[56] References Cited

U.S. PATENT DOCUMENTS

3,512,045  5/1970  Tipton et al. .............................. 361/44
4,194,231  3/1980  Klein ......................................... 361/45

Primary Examiner—Sally C. Medley
Attorney, Agent, or Firm—Paul J. Sutton

[57] ABSTRACT

A high current ground fault circuit interrupter has an induction sensor mounted on the device remote from the ground fault circuit interrupter circuitry in such a manner as to allow cables capable of carrying larger currents than the current carrying capability of the contacts in the interrupter circuitry to be passed therethrough. The induction sensor carries a differential transformer for sensing line to ground faults and a neutral transformer for sensing neutral to ground faults. It makes use of an external contactor whose coil is engaged by contacts of the ground fault circuit interrupter to interrupt the cables carrying the high currents, even at a distance somewhat remote from the ground fault circuit interrupter. The induction sensor has the capability of carrying therethrough cables of 240 volts AC line to ground or line to line.

7 Claims, 9 Drawing Sheets

HIGH CURRENT GROUND FAULT CIRCUIT INTERRUPTER

RELATED APPLICATIONS

This Application is a continuation of U.S. patent application Ser. No. 08/808,713 filed Feb. 28, 1997, which is a continuation of U.S. patent application Ser. No. 08/458,313 filed Jun. 2, 1995, which in turn is a continuation of U.S. patent application Ser. No. 08/304,101 filed Sep. 9, 1994, which in turn is a continuation of U.S. patent application Ser. No. 07/977,308 filed Nov. 16, 1992. All of the foregoing applications being abandoned.

BACKGROUND OF THE INVENTION

This invention relates to a ground fault circuit interrupter having the capability to successfully interrupt ground faults on systems having different alternating current line voltages.

There has been a great need for means for detecting when an abnormal current is flowing through line to ground and for immediately interrupting the fault to halt such an abnormal flow to protect people from electric shock, fire, and explosion. As known in the prior art, the "differential" circuit breakers previously utilized in certain European countries have been generally unsatisfactory for such purposes because they have been too insensitive to ensure complete protection to human life. A prior art arrangement attempts to solve the aforementioned problem by providing a differential circuit breaker whose current interrupting contacts, in the event of a line to ground short circuit or an abnormal leakage current to ground, are operated by a semiconductor device which in turn is energized by the secondary of a differential transformer through whose core two conductors of the electrical circuit being monitored pass to effectively function as primary windings for the differential transformer.

Known is a ground fault circuit interrupter with an inadvertent ground sensor wherein a circuit breaker connected between a power source having a neutral conductor and a phase conductor and a load is operated when the differential transformer senses that more current is flowing into the load from the source through the conductors than is flowing back to the source through the conductors. A power transformer is connected across the neutral conductor and a phase conductor and has in its magnetic field a winding for inducing a small voltage between the neutral conductor and ground to sense an inadvertent grounding of the neutral conductor at or near the load. A tertiary winding of the power transformer is connected into the neutral conductor in the vicinity of the load whereby, in the event of a grounding of the neutral conductor in the vicinity of the load, a current is thus induced in the neutral conductor which passes into the ground in the vicinity of the load, and then into the ground for the neutral connector at the power line side of the differential transformer whereupon it passes through the primary of the differential transformer and, if large enough, causes the circuit breaker to open.

Also known is a ground fault protective system comprising a differential transformer having a toroidal core through which each of two line conductors and a neutral conductor pass to form primary windings of at least one turn. The secondary winding of the transformer serves as an output winding and is connected to a ground fault interrupter circuit which energizes the trip coil of a circuit breaker having a plurality of contacts connected to the conductors of the distribution circuit. The protective system further includes pulse generator means coupled to the neutral conductor for producing a high frequency current therein upon grounding of the neutral conductor between the differential transformer and the load. The high frequency current is produced by the periodic firing of a diac when the voltage on a capacitor connected thereto reaches a certain level. Thus, a continuous train of voltage pulses is applied to a winding of an output transformer and these pulses induce voltage pulses in the neutral conductor which passes through the transformer core. The voltage pulses induced on the neutral conductor have no effect upon the current balance in the distribution system as long as the neutral conductor is not grounded on the load side of the transformer. When such grounding does occur, the voltage pulses produce a current in the neutral conductor which does not appear in either of the line conductors. This imbalance is detected by the ground fault sensing means and causes the contacts to open, interrupting the flow of current in the distribution system.

Another known arrangement discloses an electric circuit breaker including highly sensitive ground fault responsive means for protecting human life from electrical shock. Reference is made to the fact that prior art electric circuit breakers were not suitable for protecting human life which requires the detection of fault currents on the order of 3 to 50 milliamperes with load currents in the order of 10 to 100 amperes. Sensitivity adequate to protect against ground faults is achieved by a circuit breaker comprising highly sensitive ground fault responsive means including a differential transformer having a toroidal core fabricated of a magnetic material. A line conductor and a neutral conductor pass through the opening in the toroidal core, forming single turn primary windings. The differential transformer also includes a secondary winding comprising a plurality of turns wound on the toroidal core. This secondary winding is connected to the remainder of the ground fault responsive means which includes a solenoid assembly comprising an armature, an operating coil, and a frame mounted on a casing. The armature is adapted for movement between an extended position and a retracted position in response to energization of the operating coil. A latch hook is attached to the armature and disposed for engaging the armature member of the actuator assembly. Thus, energization of the operating coil causes the latch hook to draw the armature away from a latch member to initiate tripping of the circuit breaker. The highly sensitive ground fault responsive means of this arrangement comprising the aforementioned solenoid assembly is capable of opening the circuit breaker contacts in response to ground fault current on the order of 3 to 5 amperes, and thus is desirable from the standpoint of protecting human life against electrical shock.

Yet another ground fault circuit interrupter comprises a differential transformer connected to an AC source which produces a voltage output when an imbalance in current flow between the power lines connected to the AC source occurs. This AC signal voltage is coupled to a differential amplifier through a coupling capacitor, rectified, current limited, and applied to a gate of an SCR. When the SCR conducts, the winding of a transformer connected across the power line is energized, causing two circuit breaker switches to open. Also provided is a ground fault circuit for closing the switch when the line becomes unbalanced.

Still another known arrangement uses a ground leakage protector including a ground fault release coil controlled by a ground fault detector. The ground fault release coil is normally energized, and is deenergized when a ground fault appears which disables a restraining latch which results in the opening of the circuit breaker.

Yet another known arrangement uses a unitary circuit breaker of the molded case type including, within its casing, means sensitive to ground faults, means sensitive to overcurrents, and means sensitive to short circuit currents, all of which act on a common trip latch of the breaker to cause automatic opening. The ground fault sensitive means comprises a current imbalance detecting coil which energizes a tripping solenoid, releasing a normally latched plunger to cause tripping.

Also known is a ground fault protection system that employs a dormant oscillator which is triggered into oscillation to initiate disconnection of the protected distribution circuit upon occurrence of a neutral to ground type of fault.

Prior art ground fault circuit interrupters are limited to dedicated protection at their rated voltage.

SUMMARY OF THE INVENTION

It is an object of the present invention to provide ground fault protection for systems with voltages as high as 240 volts AC line to line or line to ground.

Figure 3:
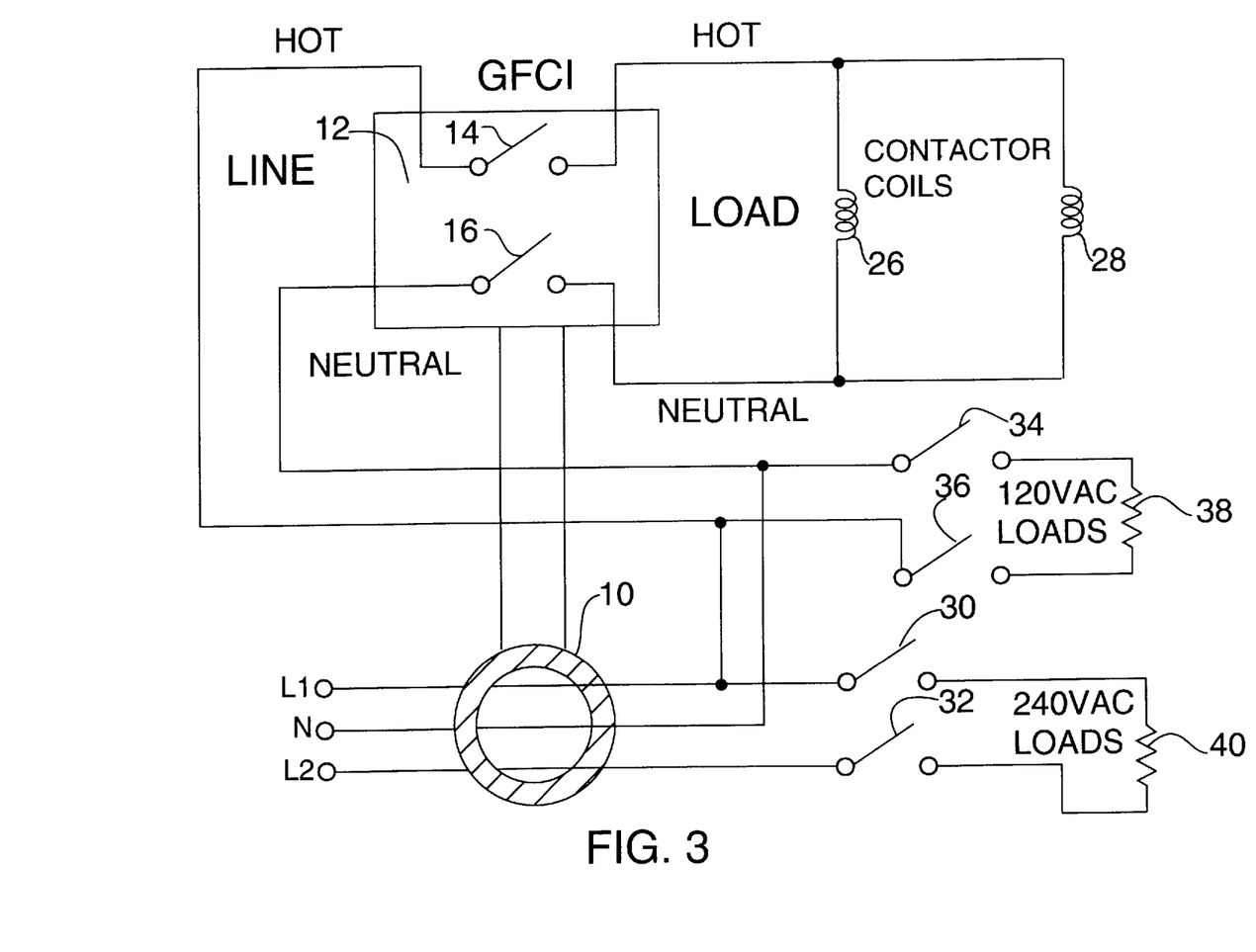
FIG. 3 is a schematic diagram of the system of the present invention when used to protect distribution systems having different voltages.

It is an object of the present invention to provide ground fault protection for systems with voltages as high as 277 volts 3 phase wye. The GFCI of the present invention differs from the prior art in that, while it requires 120 volts AC for operation, it can protect 120 volt, 240 volt, and 277 volt wye, etc., systems. As shown in FIG. 3 and explained hereinafter, through the use of 2 contactors, protection is provided for more than a single voltage system, i.e., 120 volts and 240 volts.

When 120 volts does not exist in the system, a transformer may be used to step down the voltage to the 120 volts required by the GFCI. For example, a transformer may be used to supply power for the GFCI on a 3 phase wye circuit with no neutral.

It is another object of the present invention to provide such ground fault protection for systems carrying current as high as 50 amps.

Yet another object is to provide protection for neutral to ground faults.

A further object of the present invention is to provide ground fault protection for line to ground faults.

These and other objects, which will become apparent hereinafter, are accomplished by a ground fault circuit interrupter comprising a differential transformer and a neutral transformer mounted adjacent to each other in a compartment separate from the compartment housing the ground fault interrupter circuits while providing the aforementioned current carrying capabilities, the ground fault interrupter circuitry being controlled by an integrated circuit and functioning to open the distribution cables being protected upon a fault indication input by one of the transformers for line to ground faults and the other transformer for neutral to ground faults. Current carrying capability is provided by a contactor whose coil is deenergized by the ground fault circuit interrupter circuitry and whose contactor contacts thereupon open the distribution system being protected.

The housing compartment for the differential transformer and the neutral transformer provides a magnetic shield which reduces extraneous field influence on the differential transformer. Such fields would otherwise be particularly bothersome in the system of the present invention because of the high currents involved.

DETAILED DESCRIPTION OF THE INVENTION

Identical elements are identified by the same reference numerals throughout the application.

Figure 1:
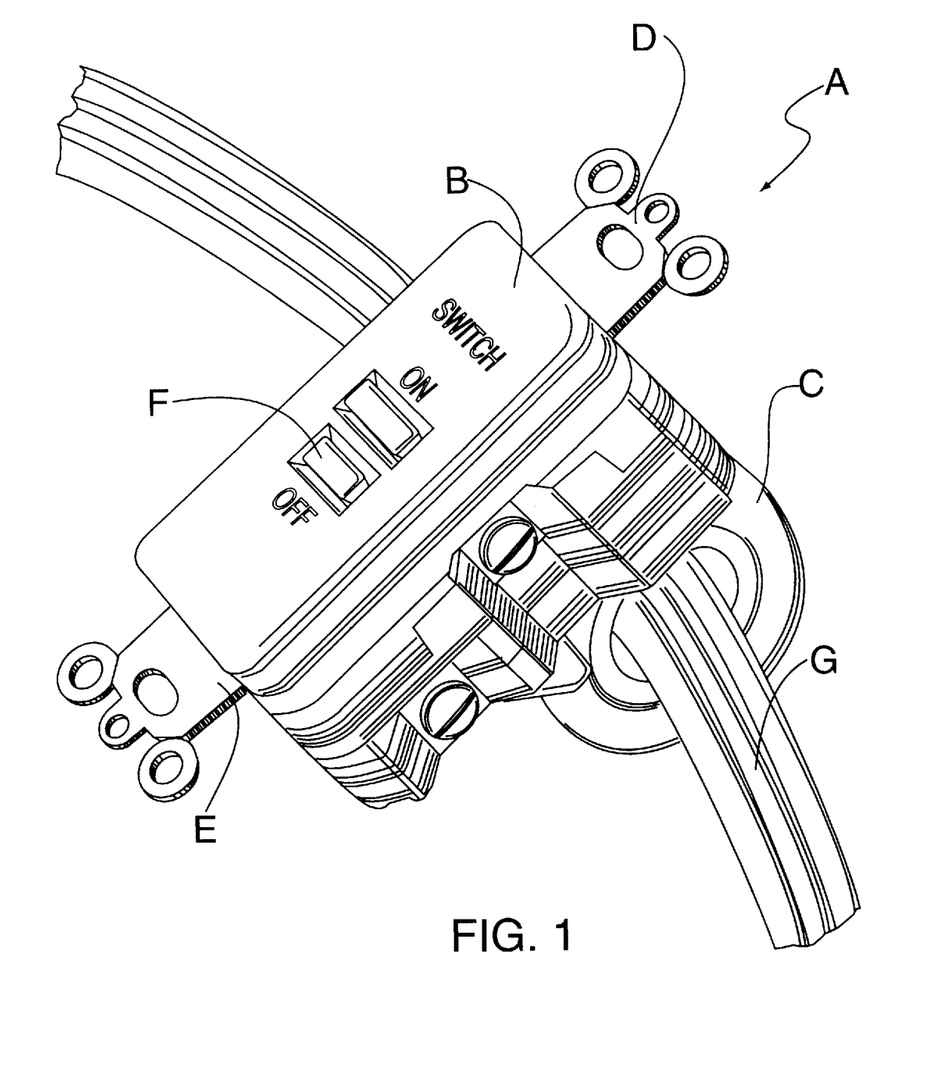
FIG. 1 is a perspective view of the high current ground fault circuit interrupter of the present invention.
Figure 6:
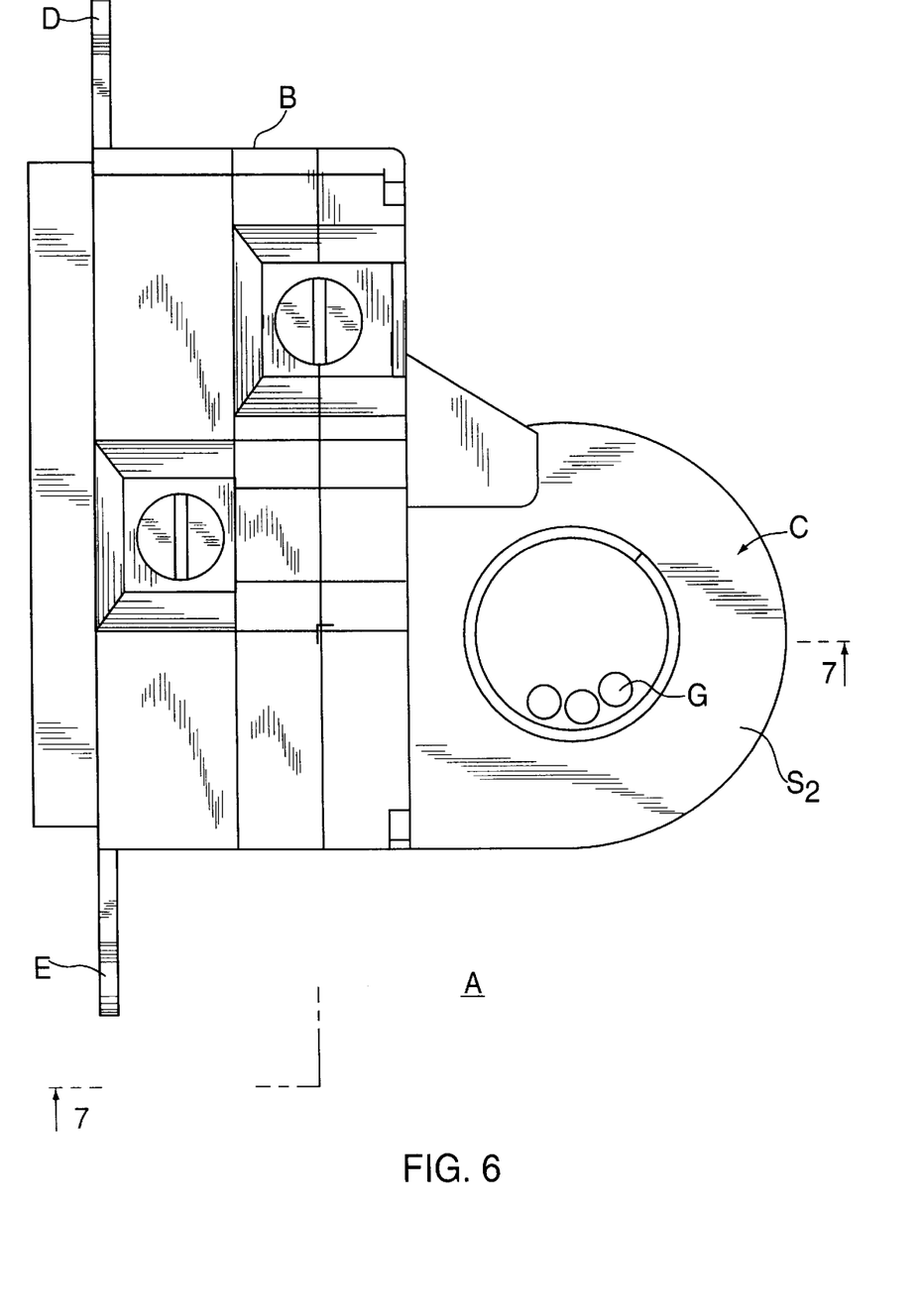
FIG. 6 is a side elevational view of the high current ground fault circuit interrupter of FIG. 1 but inverted.
Figure 7:
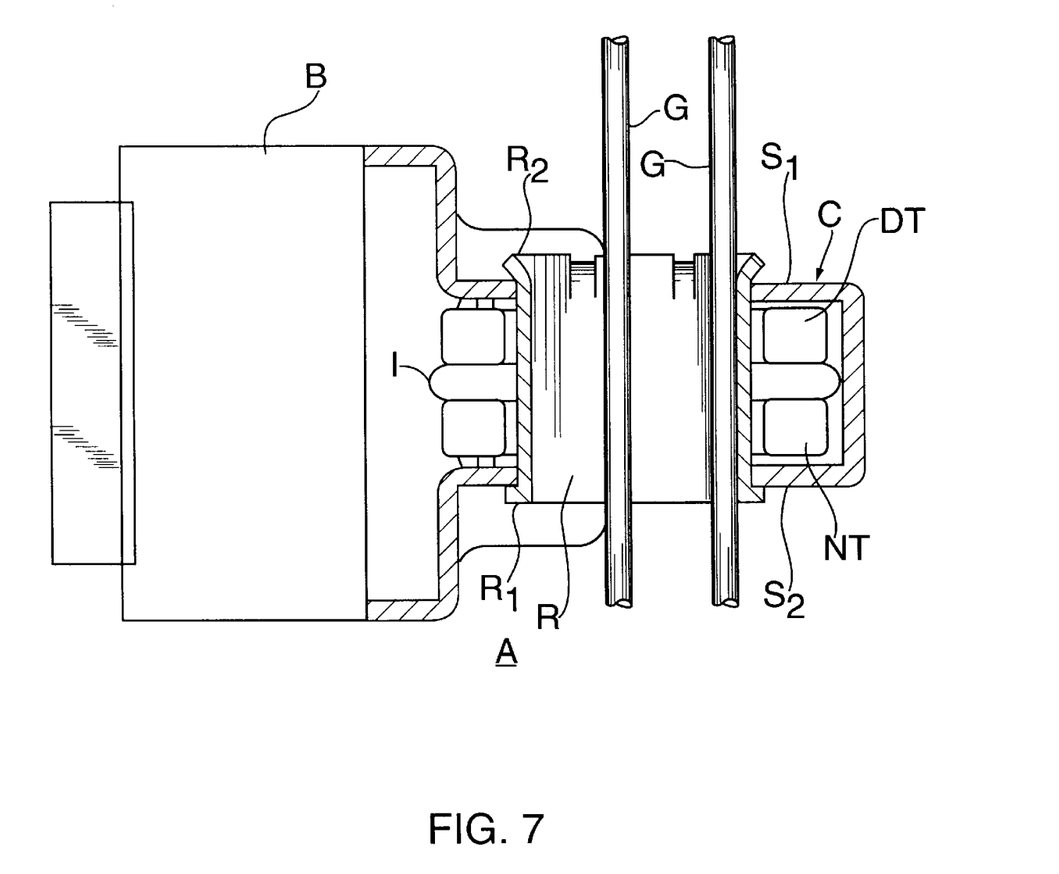
FIG. 7 is a bottom plan view of the device of FIG. 6 taken along the lines 7—7, partially in section.

FIGS. 1, 6 and 7 shows the high current ground fault circuit interrupter A comprising a housing compartment B in which the ground fault interrupter circuitry is located, and a sensor compartment C in which a differential transformer and a neutral transformer are located (see FIG. 7). Mounting ears D and E, as well as test push-button F, are also shown. The separate compartmentalization of the ground fault interrupter circuitry and the transformers allows a plurality of high current cables G to be passed through the sensor housing C of the ground fault circuit interrupter whereas, in the prior art, such high current carrying cables, i.e., around 20 to 50 amps, could not be used with ground fault circuit interrupters having the size of the present one, which has contacts rated at only 20 amps.

The differential transformer DT and the neutral transformer NT, as seen as in FIG. 7 are placed in a compartment C made up of two half shells S1 and S2 which when joined at their open long sides form a hollow toroid about the cores of the transformers DT and NT, which are held parallel to each other by a separator or spacer I. The half shells S1 and S2 may be held in assembly by any conventional fastener, adhesive, welding, swaging, upsetting, etc.

Compartment C can be fastened to the back of compartment B by any conventional means including welding, adhesives, fasteners, etc. The secondary windings on the transformers DT and NT (not shown) are connected to the ground fault circuit interrupter circuitry in housing compartment B. The individual conductors G can be fed through aperture W in compartment C, where they act as the primary winding (one turn) for the transformers DT and NT.

Figure 8:
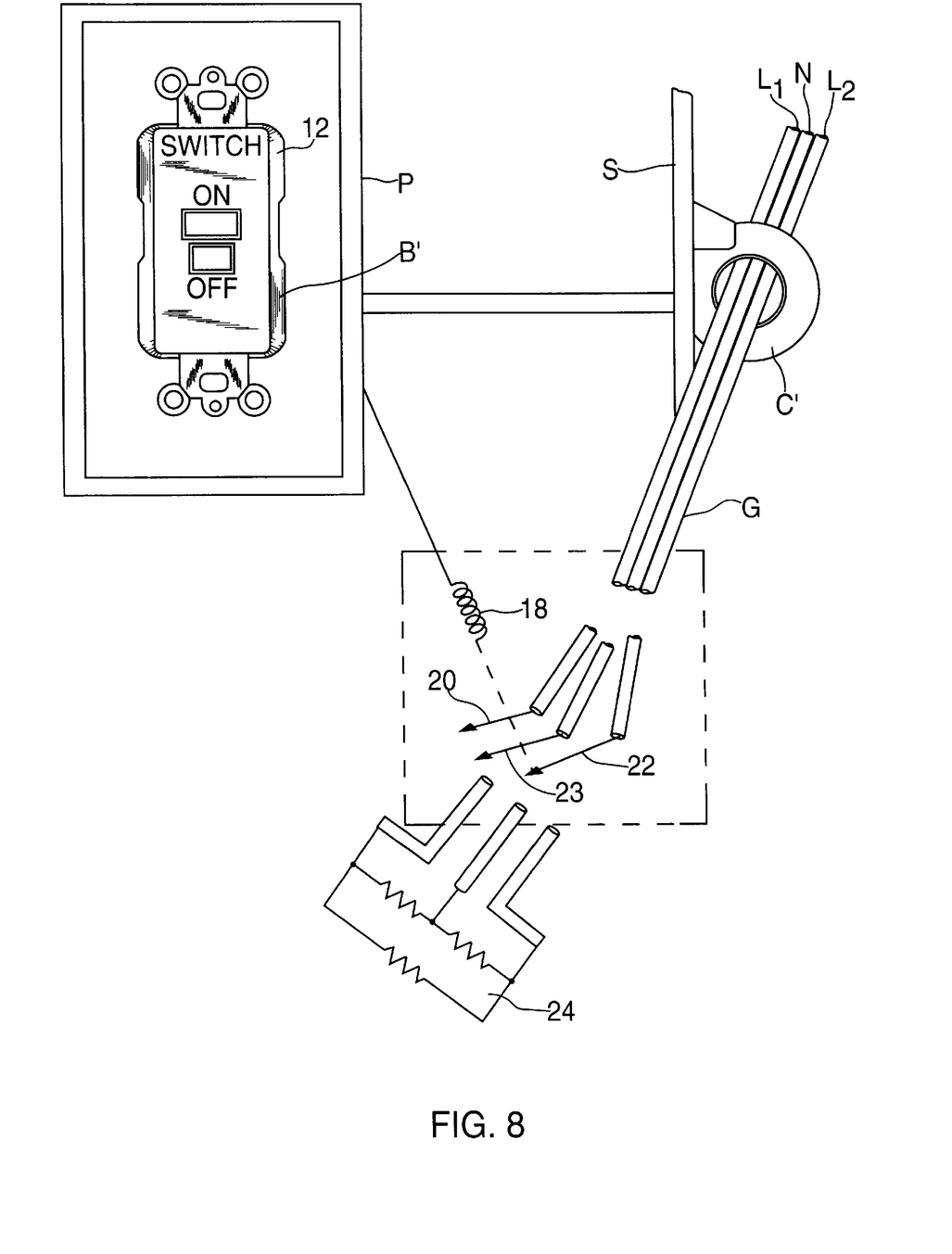
FIG. 8 is a combined front elevational view and prospective view of separated portions of the device of FIG. 1.

The arrangement of FIGS. 1, 6 and 7 places the conductors G in compartment C close to the compartment B where the ground fault circuit interrupter circuitry is located, but this proximity is not required. In FIG. 8, the ground fault circuit interrupter circuitry is in a compartment B' located at control panel P at one location, while the compartment C' is located remote from panel P at a location closer to the load and contactor contacts as will be further discussed below.

Figure 2:
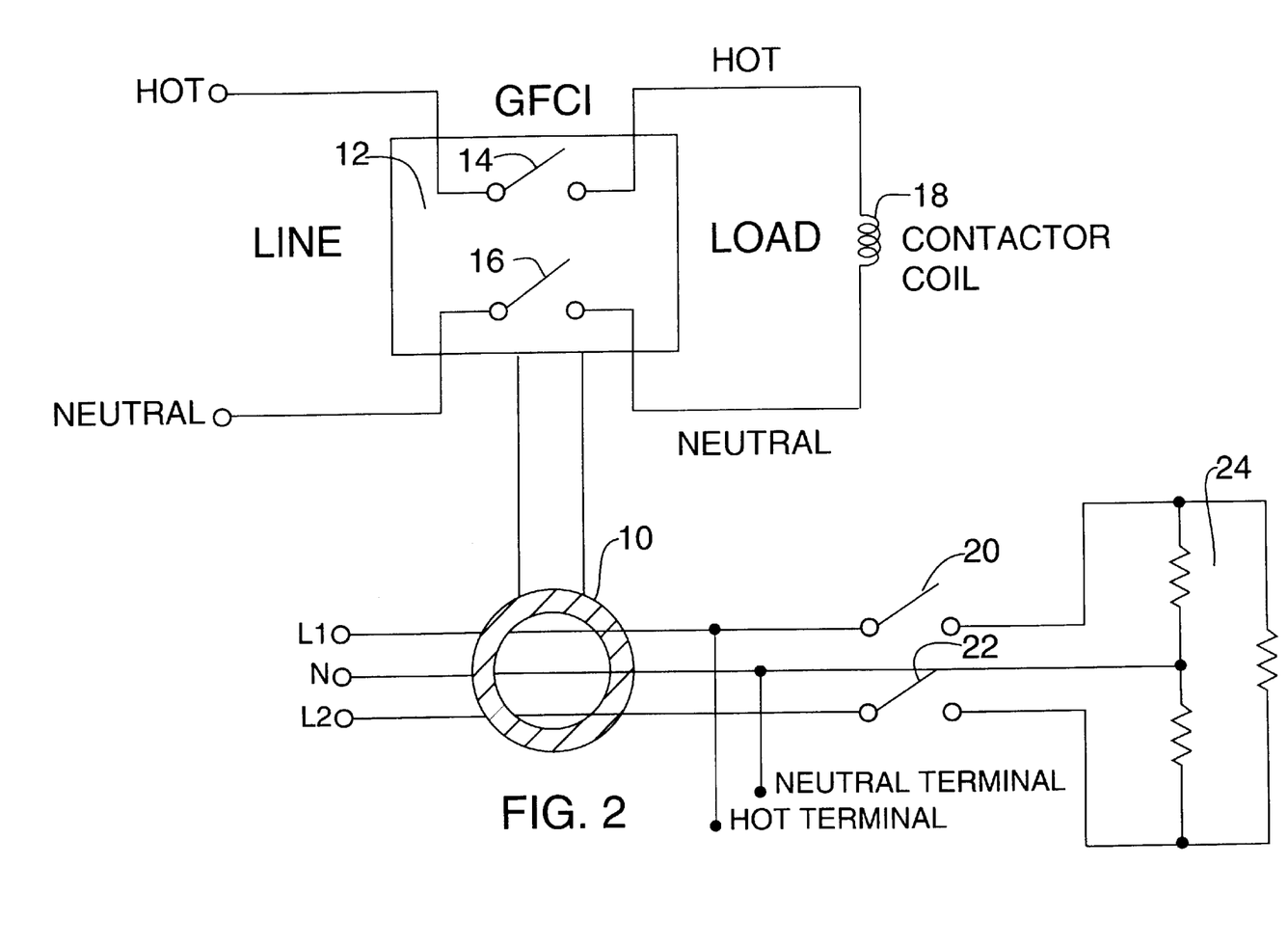
FIG. 2 is a schematic diagram of the basic system of the present invention.

One of the salient features of the ground fault circuit interrupter system shown in FIG. 2 is the inductance loop 10 mounted in sensor compartment C. This inductance loop 10 comprises two transformers the differential transformer DT and the neutral transformer NT mounted adjacent to each other, as shown in FIG. 7, and having a voltage carrying capability of 277 volts 3 phase wye. As shown in FIG. 2, two phase lines L1, L2, and a neutral line N pass through inductance loop 10. Each of these lines provides a primary winding for each of the two transformers of inductance loop 10. The secondary windings of each of these transformers are connected to respective points in GFCI 12, as shown in detail in FIG. 5. Also shown in FIG. 2 are terminals marked HOT and NEUTRAL which can be suitably connected to a 120 volt, 60 Hz source needed to power the ground fault circuit interrupter.

When either a line to ground or neutral to ground fault is sensed by GFCI 12, contacts 14 and 16 open whereupon contactor coil 18 is deenergized. This permits the spring loaded to the normally open position contactor contacts 20 and 22 of the contactor to respectively open lines L1 and L2, thus disconnecting load 24 from the circuit.

A slight modification in the schematic of FIG. 2 is required if the GFCI load, i.e., the contactor coil 18, is to be protected. In this instance, the lines labeled "HOT" and "NEUTRAL" should be fed through the inductance loop 10 comprising the two transformers first (see FIG. 3).

FIG. 3 shows the ground fault circuit interrupter of the present invention as it can be used with loads of two different voltages. In the event of a line to ground or neutral to ground fault, inductance loop 10 sends respective signals to different points in GFCI 12. GFCI contacts 14 and 16 in GFCI 12 thereupon open, thus deenergizing contactor coils 26 and 28. Contactor coil 26 permits spring loaded to the open position contactor contacts 30 and 32 connected to the 240 volt AC load 40 to open, whereas contactor coil 28 permits spring loaded to the open position contactor contacts 34 and 36 connected to the 120 volt AC load 38 to open.

As in the circuit of FIG. 2, if contactor coils 26 and 28 are to be protected, the "HOT" and "NEUTRAL" lines should be fed through the inductive loop 10 comprising the two transformers first.

Figure 3A:
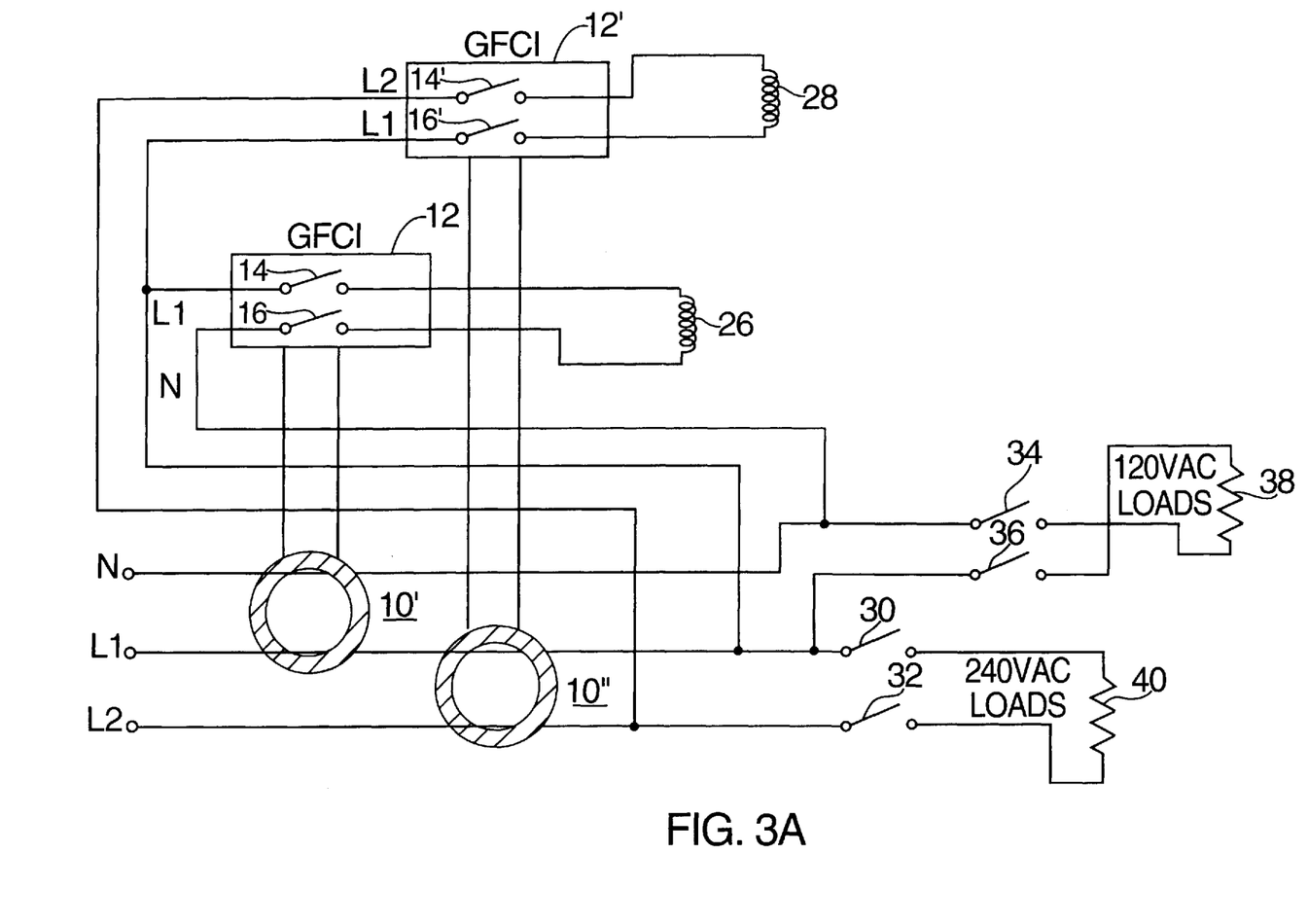
FIG. 3A is a schematic diagram of an alternative manner of implementing the device of FIG. 3 for use with distribution systems having different voltages.

FIG. 3A shows an alternative arrangement where the sets of contactor contacts are separately operable by their respective contactor coils. Thus, it is possible to open one set of contactor contacts while retaining the other set of contactor contacts in their closed condition so that only the faulted circuit is caused to open without affecting other circuits. A first inductance loop 10' receives conductors L1 and N therethrough and is coupled to a GFCI 12. A second inductance loop 10" or merely different windings upon a common inductance loop 10' is connected to a second GFCI 12' or to a different portion of the same GFCI 12. GFCI 12 is coupled to contactor coil 26 and in the presence of a fault signal from inductance loop 10' permits the GFCI contacts 14, 16, which are biased to the open position, to open and deenergize contactor coil 26. This permits the contactor contacts 34, 36, biased to the open position, to open the circuit to the 120 Volt AC load 38. This has no effect on the contactor contacts 30, 32 which remain closed and conduct current to load 40. Alternatively, a fault could exist between conductors L1 and L2 which is detected by inductance loop 10" connected to GFCI 12'. The signal to GFCI 12' permits GFCI contacts 14' and 16' to open and deenergize contactor coil 28. The deenergization of contactor coil 28 permits contacts 30, 32 to open and cut off the current to 240 V AC load 40. A fault that affects conductors L1, L2 and N will cause all the contactor contacts 30, 32, 34 and 36 to open thus removing all current to both the 120 VAC and 240 VAC loads.

Figure 4:
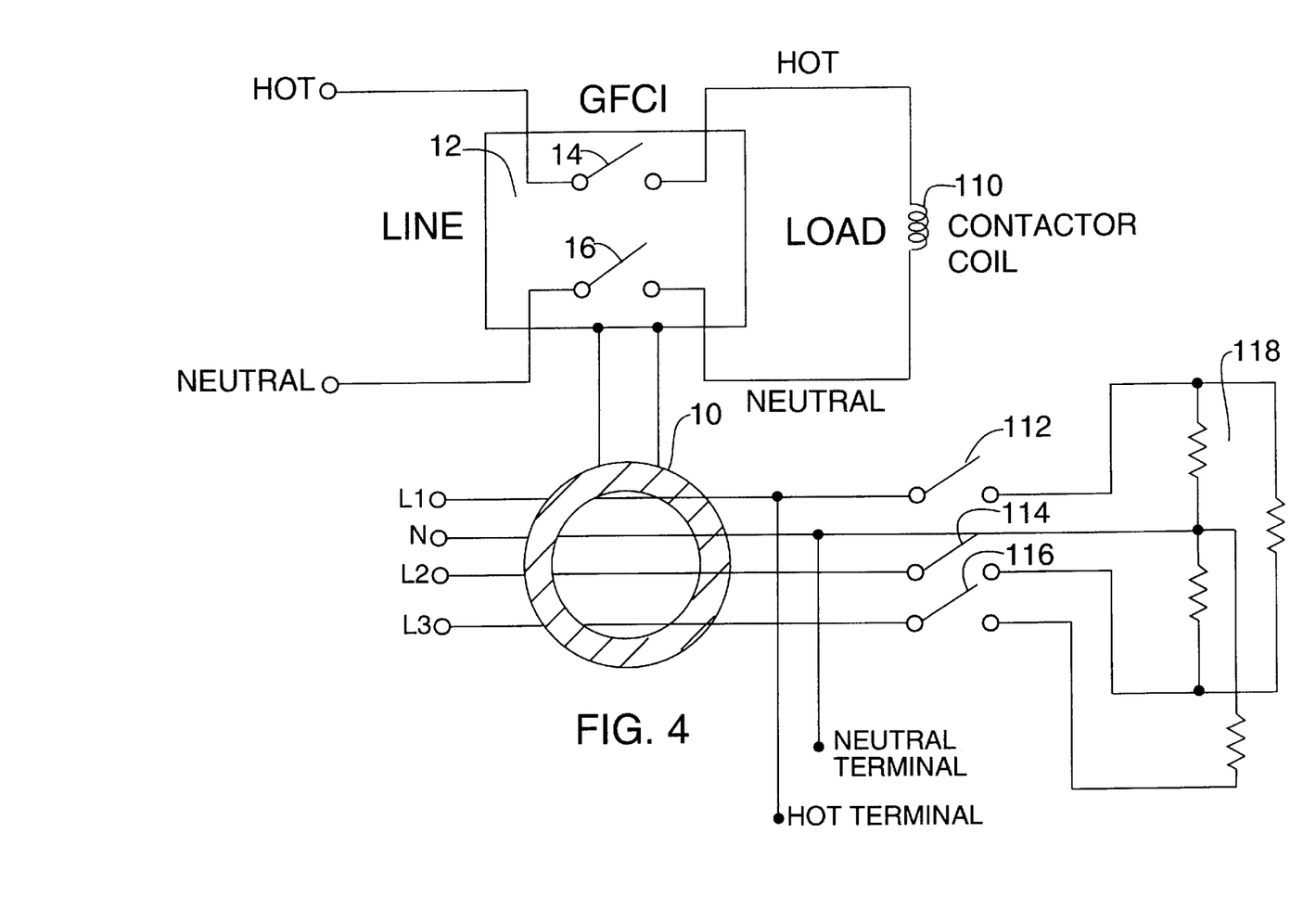
FIG. 4 is a schematic diagram of the system of the present invention when used to protect 3 phase circuits.

FIG. 4 shows a ground fault interrupter system of the present invention as applied to a 3 phase system. This arrangement functions similarly to that of FIG. 2 in that, in the event of a line to ground or neutral to ground fault, inductive loop 10 sends respective signals to different points in GFCI 12. GFCI 12 contacts 14 and 16 thereupon open and deenergizes contactor coil 110. Contactor coil 110 permits the spring loaded to the open position contactor contacts 112, 114, and 116 to open the connections of lines L1, L2, and L3 to the load 118.

Figure 5:
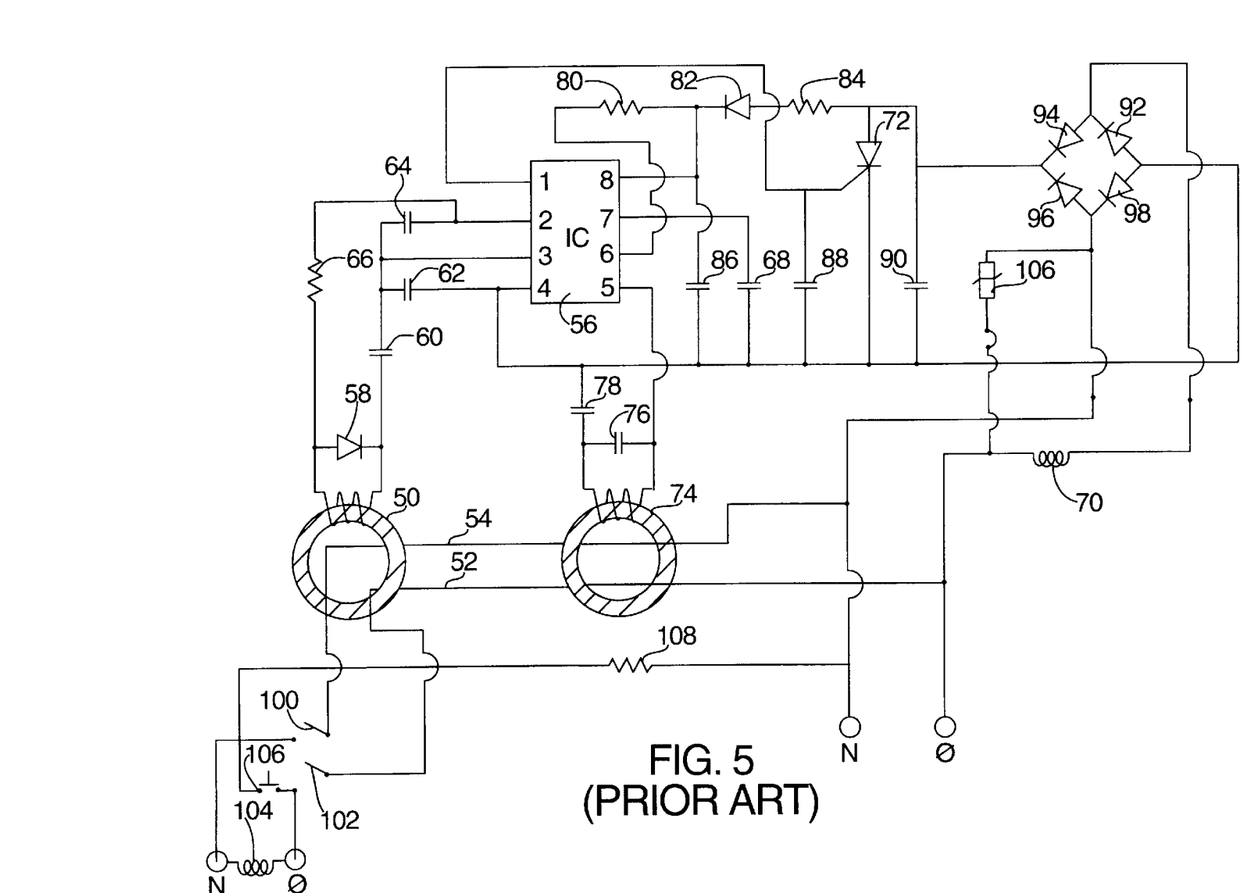
FIG. 5 is a detailed schematic of the system shown in prior art circuitry which can be used to implement the ground fault circuit interrupter diagrams of FIGS. 2 to 4.

FIG. 5 is a prior art schematic which shows basic circuitry which can be used to implement the ground fault circuit interrupter portions of FIGS. 2–4. It should be emphasized, however, that the circuitry of FIG. 5 lacks the features of the present invention of orienting the transformer coils in an inductance loop separately compartmentalized from the ground fault interrupter circuitry capable of carrying up to 277 volts, utilizing a first set of contacts in the ground fault circuit interrupter to deenergize the coils of one or more contactors having the capability of interrupting currents of up to 50 amps, and then using the contacts of respective contactors to interrupt respective load currents.

The circuit of FIG. 5, which is limited to a single phase application with 120 volts line to ground and which, though it can be found in the prior art, is explanatory of the electronic features of the present invention except as modified by FIGS. 2–4, operates in the following manner:

Differential transformer 50 monitors the flow of current in the line and neutral conductors, 52 and 54, respectively, and produces in its secondary a fault signal when the total current in the line conductor or conductors 52 does not equal the current in the neutral conductor 54. The output from the secondary of differential transformer 50 is conveyed to integrated circuit 56 through diode 58, capacitors 60, 62 and 64, and resistor 66. Integrated circuit 56 may be a type ML 1851 Ground Fault Interrupter manufactured by National Semiconductor Corporation.

A salient feature of the above circuit is the combination of diode 58 and resistor 66 which are arranged so as to promote quick discharge of capacitor 60. This discharge of capacitor 60 allows for integrated circuit 56 to be kept continuously energized and thus considerably reduces the time required for detection of a fault. This continuous energization of integrated circuit 56 from the line side was not possible in the earlier arrangements wherein power to the integrated circuit had to be brought from the load side or an auxiliary switch had to be employed so that the integrated circuit could only function intermittently. The reason for this is that capacitor 68, which is attached to output pin 7 of integrated circuit 56, and which basically controls the trip circuit, would otherwise cause SCR 72 to fire frequently, thus frequently energizing trip coil 70 and causing the possibility of trip coil burnout.

On a neutral to ground fault the system functions somewhat similarly in that transformer 74, which together with differential transformer 50 forms part of the induction coil 10, which as previously indicated is mounted remotely from the ground fault interrupter circuitry in such a fashion that high current cables can be carried therethrough, has a signal induced on its secondary windings which is carried through capacitors 76 and 78 to input pin 4 of integrated circuit 56.

The trip circuit for both types of faults is identical in that if a fault is detected by the input pins 2, 3, and 4 of IC 56, a signal is output from pin 7 of integrated circuit 56 causing capacitor 68 to charge faster. At the same time, the path to the gate of SCR 72 including resistors 80 and 84, diode 82, and capacitors 86 and 88, is energized. SCR 72 then conducts and an energization path to trip coil 70 is created through diode bridge 92, 94, 96, and 98. Capacitor 90 and MOV 106 are present for surge protection.

Upon energization of trip coil 70, contacts 100 and 102 of the ground fault circuit interrupter (equivalent to the spring loaded to the open position GFCI contacts 14, 16 of FIGS. 2 to 4) are opened which in turn causes a load, in this case, contactor coil 104 (equivalent to contactor coil 18 of FIG. 2) to react and to use its contact or contacts (not shown) to open one or more high current lines such as are shown in FIGS. 2–4.

A push-button 106 and resistor 108 are part of a test circuit which bypasses the transformers 50 and 74. Also, since the ground fault circuit interrupter is only sensitive to differences in current flow between the "hot" conductors and the neutral conductor or the neutral conductor and ground, unbalanced loading between "hot" conductors will not cause "nuisance" tripping.

Among the many advantages achieved by the present invention are the ability to handle currents of at least 50 amps provided by the construction wherein the differential transformer and neutral transformer are mounted adjacent to each other and separately compartmentalized from the ground fault interrupter to allow the passage of heavy duty cables capable of carrying such high currents therethrough, the provision for the capability to interrupt high current loads achieved by using the intermediary of a contactor coil or coils as the load for the ground fault circuit interrupter, the capability of the transformers of the induction loop 10 to handle 240 volts AC whether line to ground or line to line, and the capability to open the lines at remote distances achieved by the intermediary of the contactor between the ground fault circuit interrupter and the trip points on the lines. This is in contrast with prior art devices wherein the ground fault circuit interrupter circuitry was installed in the lines to be monitored and thus limited the current levels that could be monitored. Here the transformers in inductance loop 10, in compartment C, can see voltages up to 277 volts but they in turn pass only a small current induced in the secondary windings of the transformers DT and NT to the GFCI 112.

An additional feature of the invention is that the circuit interrupting means may be installed at a location remote from the sensing control circuitry. For example, as shown in FIG. 8, the GFCI 12 in its housing compartment B' can be mounted on a control panel P at a first location and thus made accessible to a user, while the contactor 18, the transformers DT and NT in compartment C' and the conductors G is mounted closer to the load at a location remote from the user. This arrangement protects the transformers, particularly the differential transformer, from exposure to electrical noise in the vicinity of the remote location. If desired a switch 23 can be employed to open the neutral line N. This can be done in both a two and three phase system.

The embodiments of the invention disclosed and described in the present specification and drawings and claims are presented merely as examples of the invention. Other embodiments, forms and modifications thereof win suggest themselves from a reading thereof and are contemplated as coming within the scope of the present invention.

What is claimed is:

1. A high current ground fault circuit interrupter system for separating individual electrical loads from an AC power source, supplying AC current to electrical loads, in the event one or more of the conductors conducting AC current from an AC power source to electrical loads is short-circuited or faulted to ground comprising:

a) a first electrical load;

b) at least two first conductors;

c) at least two first contactor contacts, one for each of said at least two first conductors, said at least two first contactor contacts positionable between a first, normally open position and a second closed position to permit the flow of AC current from an AC power source to said first electrical load;

d) a first contactor coil coupled to said at least two first contactor contacts to position them in said second closed position;

e) a second electrical load;

f) at least two second conductors;

g) at least two second contactor contacts, one for each of said at least two second conductors, said at least two second contactor contacts positionable between a first, normally open position and a second closed position to permit the flow of AC current from said AC power source to said second electrical load;

h) a second contactor coil coupled to said at least two second contactor contacts to position them in said second closed position;

i) a first housing having ground fault circuit interrupting means therein;

j) said ground fault circuit interrupting means having a first set of interrupter contacts coupled to said first contactor coil to selectively supply AC current to said first contactor coil to place said first contactor contacts in said second position, the absence of AC current to said first contactor coil permitting said first contactor contacts to move to said first normally open position to disconnect said first electrical load;

k) said ground fault circuit interrupting means having a second set of interrupter contacts coupled to said second contactor coil to selectively supply AC current to said second contactor coil to place said second contactor contacts in said second position, the absence of AC current to said second contactor coil permitting said second contactor contacts to move to said first normally open position to disconnect said second electrical load;

l) said at least two first conductors extending from said source of AC power to said first electrical load through said at least two first contactor contacts in said second closed position;

m) said at least two second conductors extending from said source of AC power to said second electrical load through said at least two second contactor contacts in said second closed position; and n) detection means having a first portion coupled to said at least two first conductors and a second portion coupled to said at least two second conductors, said first portion coupled to said first set of interrupter contacts and said second portion coupled to said second set of interrupter contacts whereby when a fault between two of said at least two first conductors or a first conductor and ground in said at least two first conductors occurs, said first set of interrupter contacts are operated to remove current from said first contactor coil permitting only said at least two first contactor contacts to open and disconnect said first electrical load from said AC power source; and when a fault between two of said at least two second conductors or a second conductor and ground in said at least two second conductors occurs, said second set of interrupter contacts are operated to remove current from said second contactor coil permitting only said at least two second contactor contacts to open and disconnect said second electrical load from said AC power source.

2. A high current ground fault circuit interrupter systems as defined in claim 1, wherein said detection means comprises at least two toroidal magnetic cores, at least one toroidal magnetic core for said at least two first conductors and at least one toroidal magnetic core for said at least two second conductors, each magnetic core having an open central portion defined by walls of said toroidal magnetic core and said at least two of said first conductors extend through said central portion of a first of said at least two toroidal magnetic cores and said at least two of said second conductors extend through said central portion of a second of said at least two toroidal magnetic cores to provide at least one one turn primary winding upon said at least two magnetic cores.

3. A high current ground fault circuit interrupter system as defined in claim 2, further comprising:
a) a first secondary winding about a portion of a first of said at least two magnetic cores coupled to said first set of interrupter contacts; and
b) a second secondary winding about a portion of a second of said at least two toridal magnetic cores coupled to said second set of interrupter contacts.

4. A high current ground fault circuit interrupter system as defined in claim 2, wherein:
a) said at least two toroidal magnetic cores is four, and a first secondary winding extends about a portion of a first two toroidal magnetic cores and is coupled to said first set of interrupter contacts; and
b) a second secondary winding extends about a portion of a second two toroidal magnetic cores and is coupled to said second set of interrupter contacts.

5. A high current ground fault circuit interrupter system as defined in claim 2, having a second housing for containing said at least two toroidal magnetic cores, said second housing having a passageway aligned with said open central portions of said toroidal magnetic cores whereby said at least two first conductors and said at least two second conductors can pass through said passageway of said second housing and said open central portion of said at least two toroidal magnetic cores.

6. A high current ground fault circuit interrupter system as defined in claim 5, wherein said second housing is joined to said first housing.

7. A high current ground fault circuit interrupter system as defined in claim 5, where said second housing is remote from said first housing.

* * * * *